(No Model.) 4 Sheets—Sheet 1.

J. O. BROWN & J. W. FREE.
MACHINERY FOR MAKING MALT.

No. 351,491. Patented Oct. 26, 1886.

WITNESSES.
J. M. Dolan.
Fred. B. Dolan.

INVENTORS.
James O. Brown
John W. Free
by their attys
Clark & Raymond.

(No Model.) 4 Sheets—Sheet 2.

J. O. BROWN & J. W. FREE.
MACHINERY FOR MAKING MALT.

No. 351,491. Patented Oct. 26, 1886.

WITNESSES. INVENTORS.

(No Model.) 4 Sheets—Sheet 3.

J. O. BROWN & J. W. FREE.
MACHINERY FOR MAKING MALT.

No. 351,491. Patented Oct. 26, 1886.

WITNESSES.
INVENTORS.

(No Model.) 4 Sheets—Sheet 4.

J. O. BROWN & J. W. FREE.
MACHINERY FOR MAKING MALT.

No. 351,491. Patented Oct. 26, 1886.

WITNESSES.
INVENTORS.

UNITED STATES PATENT OFFICE.

JAMES O. BROWN AND JOHN W. FREE, OF BOSTON, MASSACHUSETTS; SAID BROWN ASSIGNOR TO SAID FREE.

MACHINERY FOR MAKING MALT.

SPECIFICATION forming part of Letters Patent No. 351,491, dated October 26, 1886.

Application filed March 1, 1886. Serial No. 193,591. (No model.)

*To all whom it may concern:*

Be it known that we, JAMES O. BROWN, of Boston, in the county of Suffolk and State of Massachusetts, and JOHN W. FREE, of said Boston, both citizens of the United States, have invented a new and useful Improvement in Machinery for Making Malt, of which the following is a full, clear, and exact description, reference being had to the accompanying drawings, forming a part of this specification, in explaining its nature.

The apparatus and process described in this specification are interdependent, and will be described together.

Figure 1:
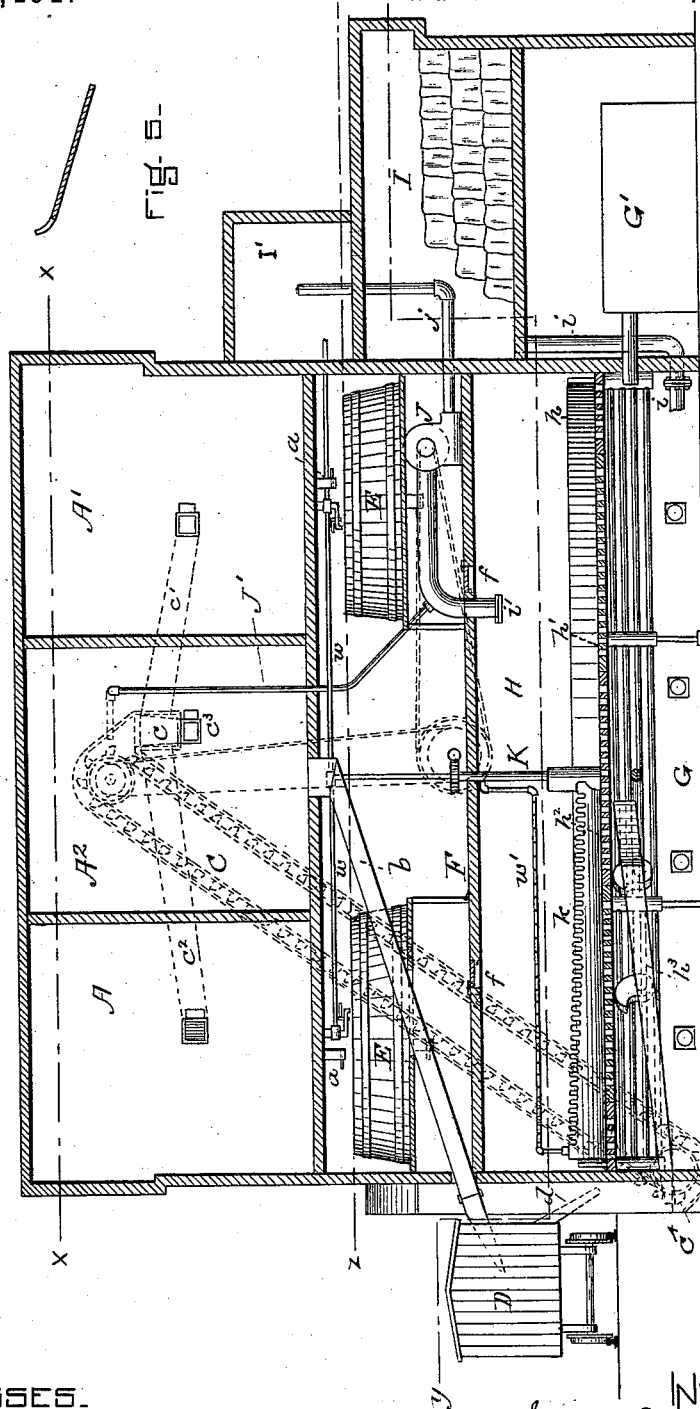
Figure 2:
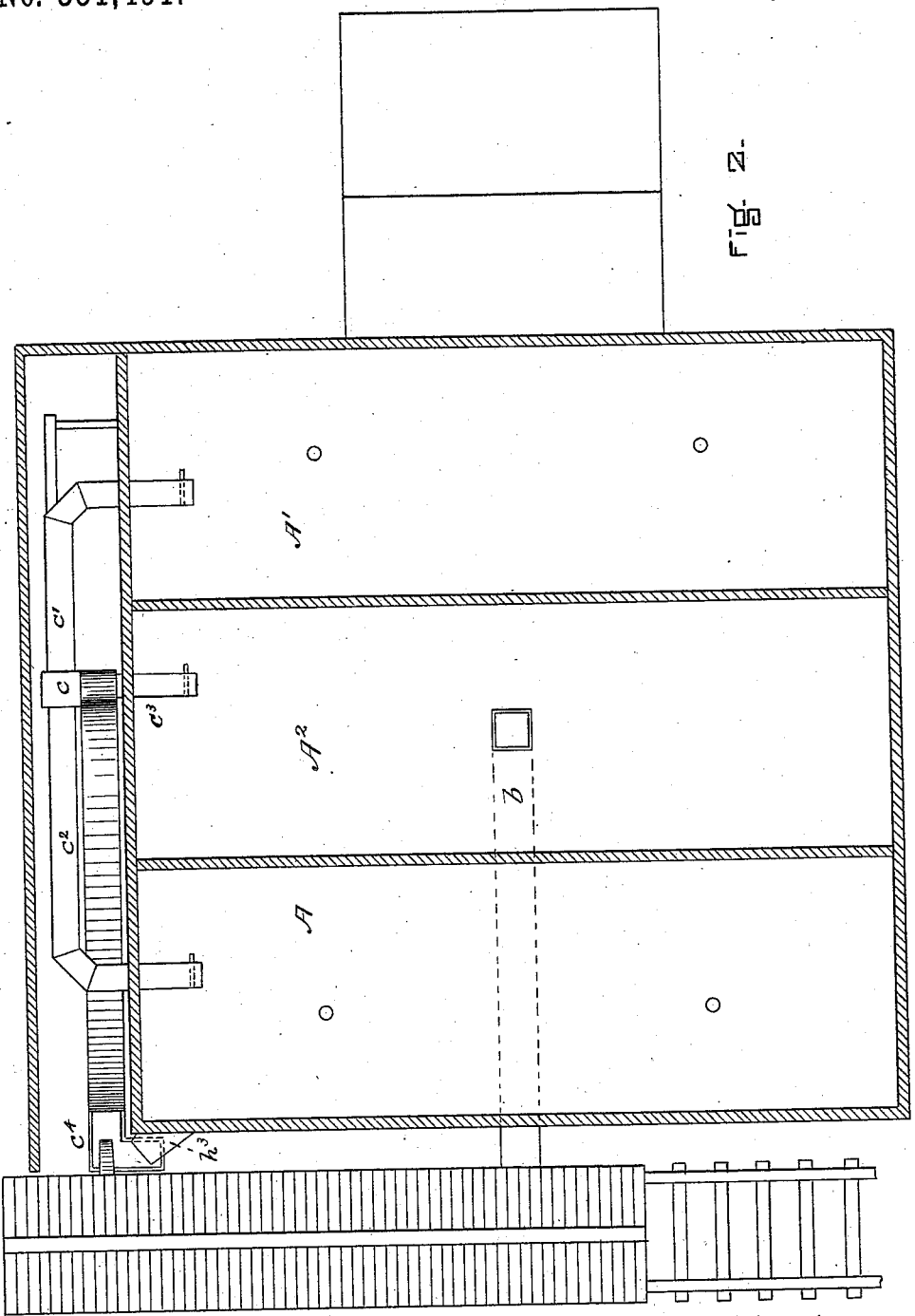
Figure 3:
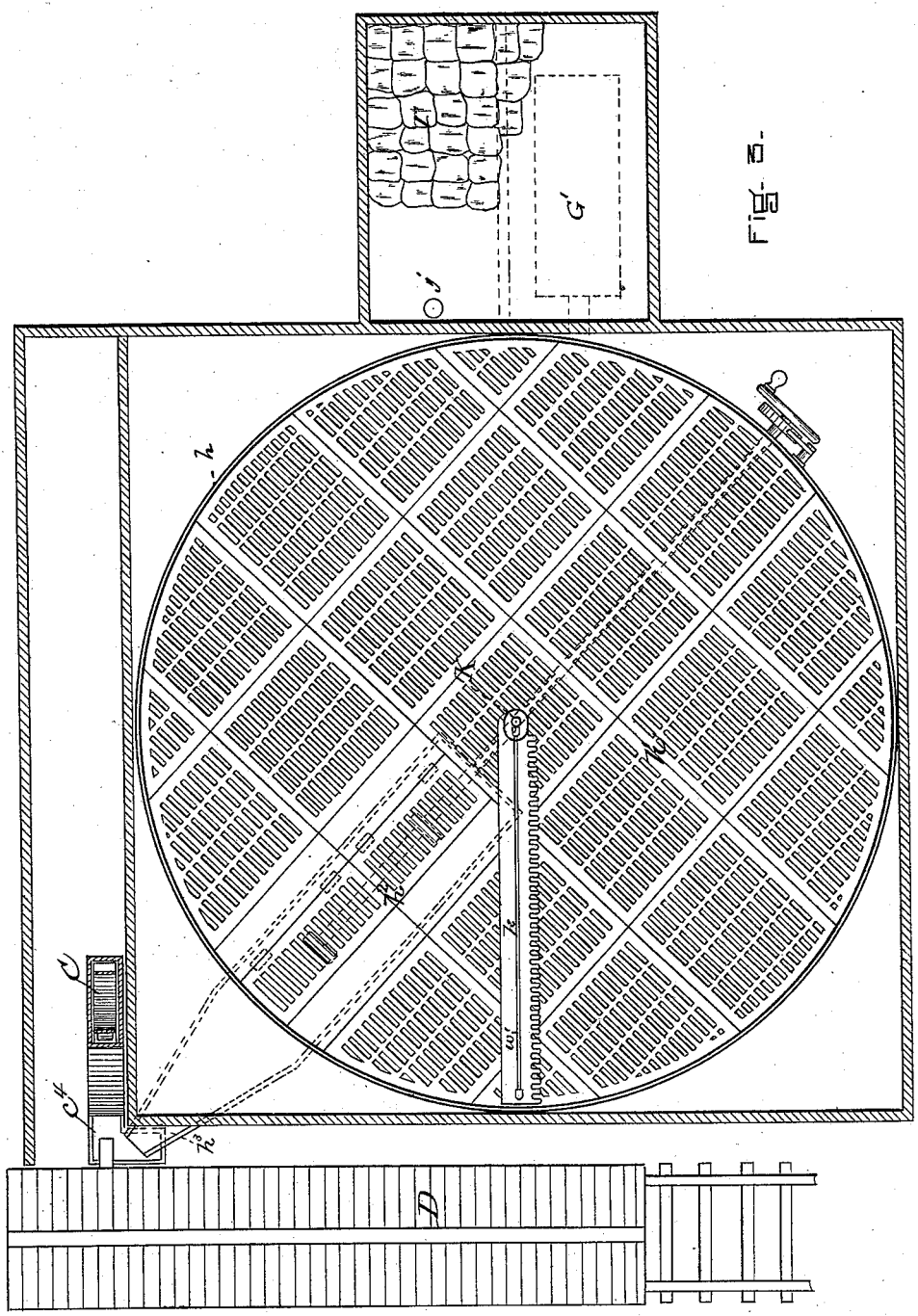
Figure 4:
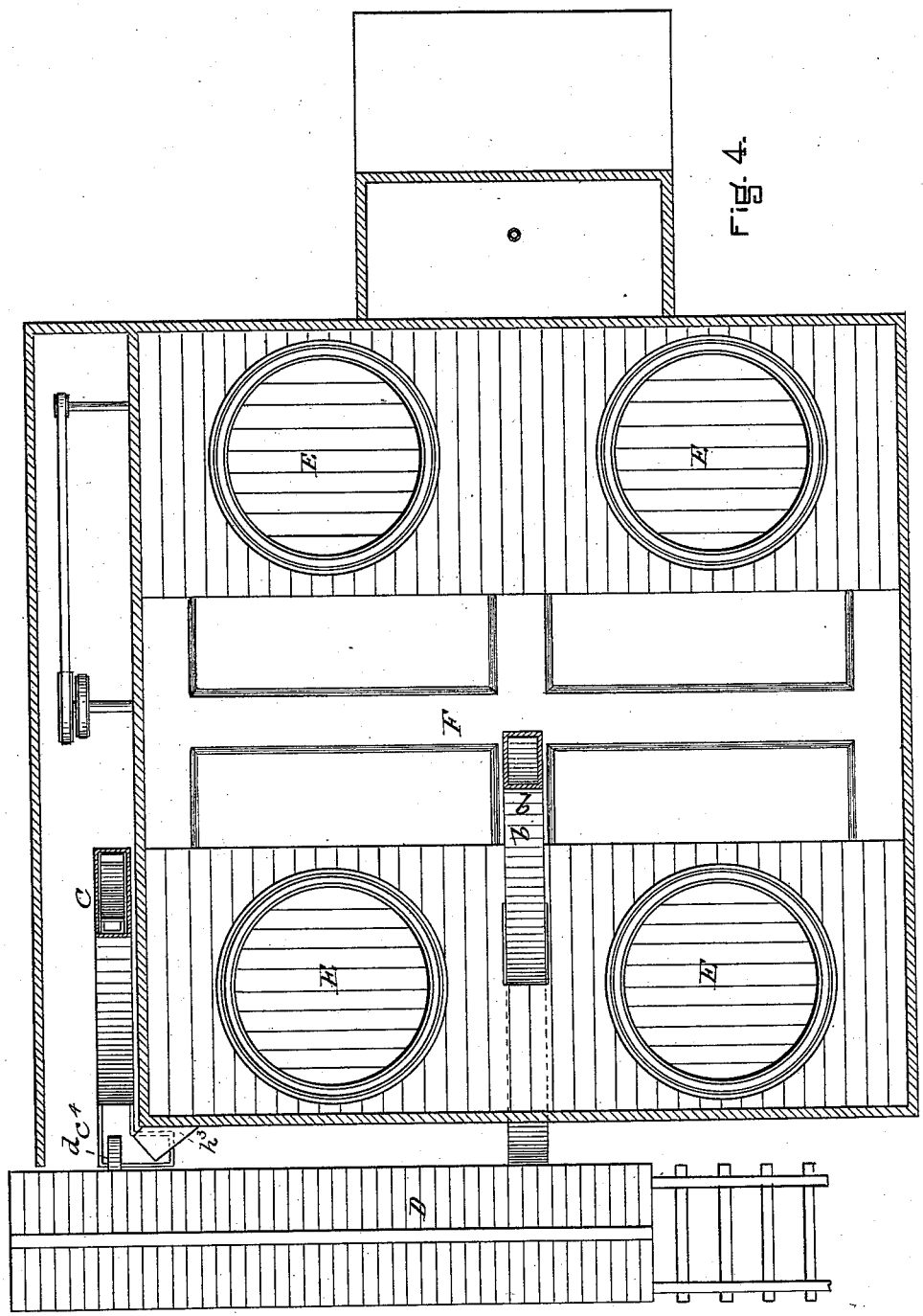

In the drawings, Figure 1 represents a sectional elevation of the building and essential parts of the machinery for which we desire a patent. Fig. 2 is a view in horizontal section upon the line $xx$ of Fig. 1. Fig. 3 is a horizontal section upon the line $yy$ of Fig. 1, and a plan view of the parts below said line. Fig. 4 is a horizontal section upon the line $zz$ of Fig. 1, and a plan view of the parts below said line. Fig. 5 is a view in side elevation of one of the fingers of the scraper or stirrer, and in horizontal section of the stirrer-plate.

The building for conducting the process is divided into four stories. The upper story has three longitudinal bins, which occupy substantially the whole of the floor. Of these, those lettered A A', Fig. 1, are for the storage of grain, and that lettered $A^2$ in the center is for the storage of malt. An elevator of ordinary form, C, extends through the various floors of the building from bottom to top, and grain is delivered into the chamber $c^4$ at the foot of the elevator-chute from a car, D, brought up alongside the building. The grain is then carried by the elevator into the chamber $A^2$ on the upper story of the building, and there delivered into a box, $c$, from which run chutes $c'$ $c^2$ to the chambers A A'. Another distributer, $c^3$, is at the bottom of the box $c$, and either one of the three chutes $c'$ $c^2$ $c^3$ may be shut off from the box $c$ by appropriate slides of usual construction. The storage-bins A A' being filled with grain and the process ready to be operated, the tanks E on the couching-floors below the chambers A A' are partially filled with water, and grain is set to soak therein, being admitted into these tanks through chutes $a$, which are provided, as shown, with slide-valves. Water-pipes and cocks $w$ admit water from some source of water-supply into these tanks. The barley, having been properly soaked in the tanks E, which will take a longer or shorter time, according to the quality of the grain, usually, however, about two days and a half, and always, according to our experience, not less than two days, is discharged upon the couching-floor F, immediately beneath the tanks, or on other portions of the same or other floors, where it is allowed to germinate, and in this operation may be assisted by starting fires in the furnaces G on the lower floor, thus furnishing artificial heat to hasten the germination, instead of requiring the barley to be heated entirely by heat generated within itself. After the barley has been properly forwarded upon the couching-floor F, it is dropped through that floor by man-holes $f$ upon the sprouting and drying floor $h'$. This floor is surrounded, as shown in Fig. 3, by a circular wall, $h$, which may be of any convenient height. Usually about two feet will be enough; but it may be much higher, or constitute the walls of the room H, if desired. The floor of this room H is perforated like the ordinary malt-floor, and beneath it is arranged the furnace, shown in Fig. 1 as a fire-box having a bank of pipes over it, which I prefer shall be a furnace which generates steam heat, because for such purposes the steam heat is perhaps more uniform than heat from other sources, and better under control; but I may in lieu of steam heat use hot air generated from an adjacent hot-air furnace, G', which should, however, be provided with an apparatus for moistening the air, if necessary, at the first stage of the process on the sprouting and drying floor, and I provide a branch, $w'$, of the water-pipe, which is perforated in various places from end to end, and can be turned around the center of the circular wall $h$, and thoroughly sprinkle the partially-made malt upon the floor, if it is in danger of getting too dry.

The Perry English Patent No. 3,749, of September 26, 1876, shows something which has a resemblance to this apparatus; but it is not described in the said Perry patent that it is absolutely essential that the atmosphere of the sprouting-chambers and couching-floor must be a moist and warm atmosphere—like, for instance, the atmosphere of a greenhouse— and such an atmosphere can only be maintained by having the air saturated with water. In other words, something very like a "sweat-box" atmosphere must be kept up in the chamber H and on the couching-floor while this work is going on. We prefer to do this by the use of a furnace immediately under the chamber H and communicating with it, which furnace has steam-radiating pipes to make the atmosphere equable, and heats the chamber H and the couching-floor above it without furnishing a supply of fresh and dried air to them, for if hot dried air were driven through the chamber and then taken away the germination would be stopped or impaired. Although this desirable atmosphere is best kept up by the furnace G immediately under the chamber H, yet, as we have said, if suitable provisions are adopted for sending a current of practically saturated warm air from an air-furnace through this chamber H, so that the air shall not deprive the sprouting barley of its moisture, the temperature may be kept up without interfering with the germination; but we do not like the plan of using a separate air-furnace with moistened air, because it is difficult to moisten air sufficiently to saturate it, and because, unless the moistened air were returned to the furnace to be reheated and again sent into the chamber H and the couching-floor, there would be a considerable waste of fuel, and such an arrangement as this would involve more expensive and elaborate machinery than we have here provided.

When the germination has gone sufficiently far, or before that time, the heat from G or G' is shut off and cold air introduced to stop the germination. This air is drawn through the ice-box I, or other usual refrigerating apparatus—such as the radiators of an ice-machine—and for the purposes of economy, to render the cold air as dry as possible, a circulation is established between the chamber H and the ice-chamber I, by which the same air is used over and over again. This is accomplished by the arrangement of the pipe $i$, proceeding from the ice-chamber and terminating below the perforated floor of the chamber H, and by means of the pipe $i'$, which is connected with the exhaust-blower J, which sucks air from the chamber H and delivers it through the pipe $j$ into the ice-chamber I, or a chamber, I', adjacent to it, in communication with said chamber I by means of an opening (not shown) through the partition dividing said chambers from each other, where the moisture from the air will be dried out of it by coming in contact with the ice or other refrigerating apparatus.

In order that the malt may be thoroughly aerated and uniformly exposed to the air, either hot or cold, which comes through the perforated floor, there is erected at the center of this floor a revolving shaft, K, which has mounted upon it a horizontal scraping-stirrer, $k$, the foremost edge of which is close to the floor of the chamber, and in the revolution of the shaft K inserts itself beneath the malt, and as the surface of the stirrer $k$ is inclined to the floor of the chamber H the malt will slide up the blade of the stirrer $k$ and fall over its rear edge or side, thus always making a clear space at the place which the foremost edge of the stirrer has just passed for air to rise through the perforated floor and pass through the falling malt which is dropping down at the rear of the stirrer.

In the sprouting of malt, the barley being pretty closely piled, the rootlets of the barley will project and entwine themselves together, so that the barley will be matted together almost as if it were felted. In order to break up this mat the rear edge of the scraper is made, as shown in Fig. 1, with teeth, and these teeth are somewhat bent upward and forward, so as to make the slope of the surface of the scraper $k$, at its rear side, a curvature toward the direction in which the scraper is moving. The malt being thus detained and held by these teeth at certain intervals in the line of its ascent, and being constantly pushed by the other masses of malt against which the scraper is constantly pushing, and which are constantly being lifted by it, the malt will meet with less resistance at the intervals between these teeth than at the teeth themselves, and consequently the motion of the stirrer will tear asunder the intertwined rootlets and the malt will be loosened up, so that after a few revolutions of the stirrer the individual grains of the sprouted barley will be quite separate from each other, and can be aerated upon all sides. The teeth of the stirrer, by causing a loosely following shower of barley, insures the presentation of more separate barley-grains to the action of the air forced through the same, and when the rootlets become dry the teeth break and separate them from the grain, when they may be removed or winnowed out from the malt by means of the exhaust-blower. The scraping-stirrer may be used, however, without teeth when desirable so to do.

When the germination has been checked by the chilling and cold-drying process, the exhaust-blower J is stopped, and the malt is then dried, either by drawing warm air through it by the exhaust-blower, which is to be discharged out-of-doors instead of into the ice-box, or by allowing warm air to rise through it without the aid of a blower or exhaust to remove it, having recourse to natural ventilation all through the time of drying, the shaft K and its stirrer $k$ being kept in revolution. When the malt is being dried, a gradually higher temperature is applied to it until very hot dry air obtained from the hot-air furnace G' is used, which gives the plump and brittle quality to the malt and makes it of bright appearance. When the malt is quite completed, it is discharged by the scraping-stirrer through the man-hole $h^2$ in the floor of the chamber H into the chute $h^3$, which conducts into the pocket $c^4$ at the bottom of the elevator-shaft, and it is thence lifted to the pocket $c$ and delivered through the chute $c^3$ into the storage-chamber $A^2$, from which it may be taken, when desired, by the chute $b$ and delivered into the car D. By this arrangement of apparatus the four stages in the production of malt may be carried on at once—namely, steeping, couching, germinating, and drying—and a car-load of barley can be taken in from a car and the car immediately loaded up with malt and sent away. These processes, too, can all be compressed into a space of time not exceeding six days, instead of the fourteen days or more required in the old-fashioned way, the steeping seldom requiring more than two and a half days, and usually less, the couching on floor F not requiring more than two days, and usually much less, and the completion of the germination upon the sprouting and drying floor of the chamber H requiring less than two days, and never more, the checking of germination by the blast of cold and dry air being usually accomplished inside of an hour, and the drying in very much less time than usual. It will be seen by this arrangement that the process is a continuous one, and that the handling of the grain from one stage of the process to another is done almost altogether by gravity, and that the use of power for handling the grain is confined to the elevation of the grain before the malting process is entered upon, and of the malt after the malting process is completed, and to keeping it in motion at appropriate times under the aeration of cold and heat upon the floor of the sprouting and drying chamber H.

The elevator, of course, may be entirely on the outside of the building, instead of inside, as represented, if desired.

To free the malt from rootlets and dust as it is being delivered to the chamber $A^2$, I have connected the exhaust-blower therewith by means of a pipe, J', arranged to extend from the exhaust-pipe to open in close proximity to the elevator in the chamber $A^2$ and elevator-casing, as represented. The suction of air through this pipe causes the dust and rootlets to be drawn through it, and to be discharged by the exhaust-blower into the outer air.

Having thus fully described our invention, we claim and desire to secure by Letters Patent of the United States—

1. The combination, in one apparatus, of a single elevator with two supply-chutes, $h^3$ $d$, delivering into one pocket, $c^4$, and with one pocket, $c^3$, delivering into two or more delivery-chutes, $c'$ $c^2$ $c^3$, which delivery-chutes are on the highest level of the apparatus, with a series of elevated soaking-tubs, E, upon the middle floors of the apparatus, and with the couching-floor beneath said elevated soaking-tubs E, and with a sprouting or drying chamber, H, having combined therewith appropriate sources of supply for hot and cold air, and proper means for the circulation thereof through the chamber, and with a revolving stirring-blade, $k$, substantially as described.

2. The revolving stirring-blade $k$, placed upon an incline to the floor of the chamber H, and formed with teeth upon its back and upper edge, which teeth are curved upward and forward from the general slope of said blade $k$, substantially as and for the purposes described.

3. The combination of the elevator-pocket $c$ with the malt-chamber $A^2$ and the grain-chambers A A' by the chutes $c'$ $c^2$ $c^3$, and with the single elevator-belt C, single pocket $c^4$, grain-chutes $d$, and malt-chute $h^3$, substantially as and for the purpose described.

JAMES O. BROWN.
JOHN W. FREE.

Witnesses:
F. F. RAYMOND, 2d,
FRED. B. DOLAN.